United States Patent [19]

Carmi et al.

[11] 4,140,512

[45] Feb. 20, 1979

[54] LIQUID COOLING SYSTEM FOR GLASS FORMING APPARATUS

[75] Inventors: Arieh Carmi, Big Flats; Zung S. Chang, Painted Post; Thomas J. Rayeski, Corning, all of N.Y.

[73] Assignee: Corning Glass Works, Corning, N.Y.

[21] Appl. No.: 890,405

[22] Filed: Mar. 27, 1978

[51] Int. Cl.² ............. C03B 11/12; C03B 9/14; C03B 9/38

[52] U.S. Cl. ............. 65/319; 65/355; 65/356

[58] Field of Search ............ 65/355, 356, 137, 265, 65/319, 68

[56] References Cited

U.S. PATENT DOCUMENTS

| | | | |
|---|---|---|---|
| 2,988,851 | 6/1961 | Holscher | 65/356 |
| 3,224,860 | 12/1965 | Stinnes | 65/355 |
| 3,258,324 | 6/1966 | Torok | 65/362 |
| 3,404,974 | 10/1968 | Belehtepe et al. | 65/356 X |
| 3,644,110 | 2/1972 | Sendt | 65/356 X |
| 3,849,101 | 11/1974 | Wythe et al. | 65/356 X |
| 4,059,429 | 11/1977 | Carmi et al. | 65/356 X |

*Primary Examiner*—S. Leon Bashore
*Assistant Examiner*—Frank W. Miga
*Attorney, Agent, or Firm*—Burton R. Turner; John P. DeLuca

[57] ABSTRACT

A closed liquid cooling system is provided within a mold body and pressurized to a desired extent so as to control the amount of heat removed from a glass-contacting mold wall portion through nucleate boiling, while simultaneously creating a thermal-siphon effect to avoid film boiling which would create an undesirable vapor insulating layer adjacent such mold wall.

7 Claims, 1 Drawing Figure

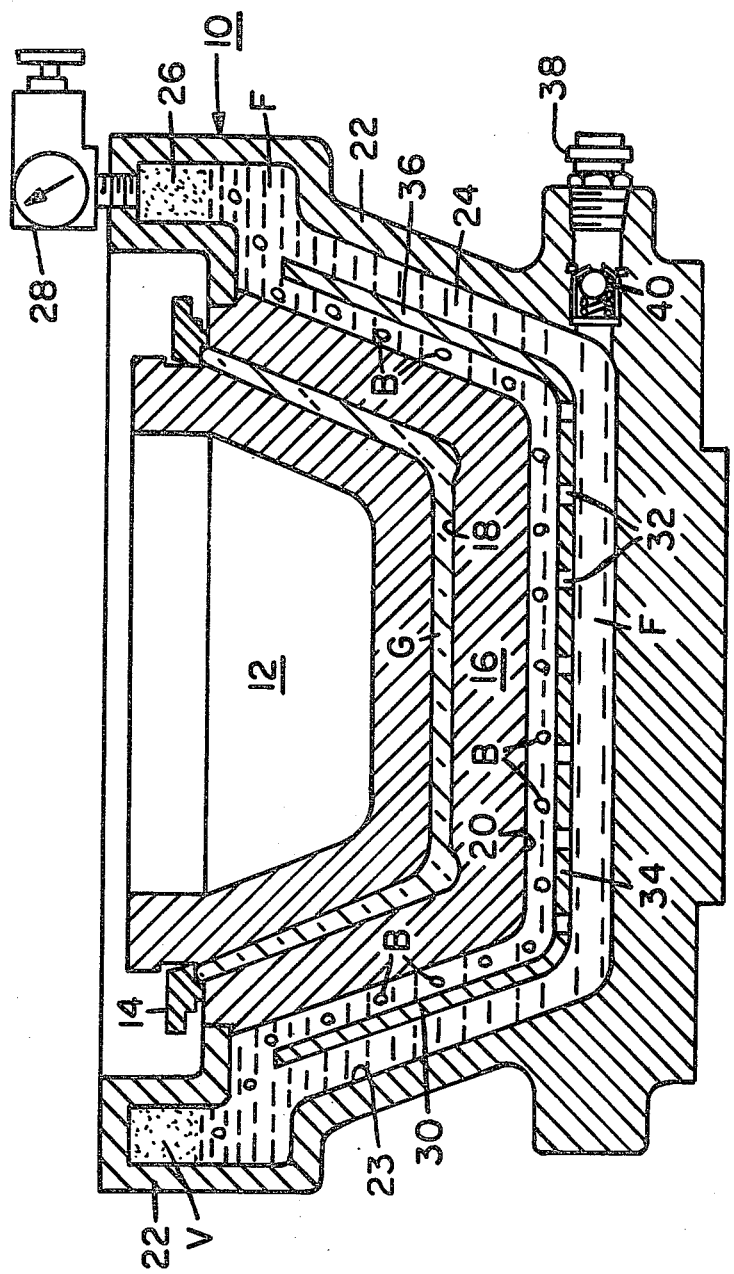

LIQUID COOLING SYSTEM FOR GLASS FORMING APPARATUS

BACKGROUND OF THE INVENTION

In the pressing of glass articles, such as culinary ware, TV bulb components, and other vessels, a major consideration is the control of heat distribution and removal in order that the surfaces which form the glass articles are neither too hot nor too cold. If the surfaces become too hot, sticking of the glass may occur to the mold, and if the surfaces become too cold, a crizzling or checking of the glass may occur.

Various methods have been utilized in the past to control the cooling of mold surfaces including the utilization of compressed and fan air as shown in U.S. Pat. Nos. 2,688,823 and 4,032,317, and the utilization of water cooling as shown in U.S. Pat. Nos. 3,054,220 and 3,468,654. The use of fan air or compressed air for cooling mold equipment not only limits production speeds due to the limited degree of cooling obtained thereby, thus rendering such air cooling systems to be rather costly, but also results in excessive noise due to the high volume and velocity of air required. Water cooled mold systems, on the other hand, which include both contained or enclosed systems, and exposed or open spray-type systems, have not been entirely satisfactory. The closed system with its attached water supply does not readily lend itself for use with revolving molds, and further there is a tendency for a film to form which insulates further cooling; and the open system creates a problem of steam which is detrimental to both the worker and apparatus alike, plus the fact there is the requirement for collecting the spent cooling water.

Glass articles, such as for example vessels and other culinary ware, are customarily formed by placing a charge of hot molten glass into a mold cavity and then introducing a plunger into the charge of glass so as to press-form a finished article between the mold and the plunger.

The repeated exposure of the mold and plunger, as they come into contact with the molten glass during the forming operation, causes the temperatures thereof to rise, and therefore it is imperative that they be cooled to within acceptable working ranges. If the mold, for example, is not cooled sufficiently, it will reach a temperature at which the glass will begin to fuse to the metal interior forming surface of the mold, which will of course necessitate the stoppage of the forming equipment in order to repair the damage caused by the fusing of the glass to the mold part. If the temperature of the mold is not maintained, or if permitted to fall below a predetermined level, wrinkles, checks and other imperfections can result in the finished article. Therefore, it is evident that there exists a desirable working range within which the molding parts should be maintained.

The present system includes the use of a liquid coolant, such as water, within a closed system which takes advantage of the large latent heat of vaporization as the coolant adjacent the forming wall boils and evaporates, thus rendering more effective heat transfer and thereby allowing for increases in production speeds. However, as previously mentioned, nucleate boiling is effected while film boiling is inhibited, thus facilitating the desired high rates of heat removal. Nucleate boiling is the ordinary boiling of a fluid such as water wherein small gaseous bubbles form on inside surfaces of a container for the liquid and the bubbles then disengage themselves and are carried to the top of the liquid. In this manner, a practically continuous layer of liquid is always in contact with the surface of the container. Film boiling, however, differs from nucleate boiling in that the heat input into the container of fluid is so great that all of the small gaseous bubbles that form on the interior of the fluid container cannot escape from the surface and therefore they unite to form a continuous gaseous interlayer between the fluid and the container. When this occurs, a gaseous insulating layer is formed and the quantity of heat carried of by the water drops markedly and the temperature of the container will start to rise rapidly.

U.S. Pat. No. 3,468,654 recognized the problem of film boiling in a closed system utilizing continuously circulating low velocity cooling water, and proposed to overcome such problem by periodically supplying high velocity cooling water to purge the film from the forming wall so that nucleate boiling could again be accomplished.

Other forms of liquid cooling of mold parts include the use of molten metals such as shown in U.S. Pat. Nos. 3,258,324 and 3,285,728, however although the liquid metal cooling is self-contained within the mold parts, both references require the addition of exteriorly coupled recirculating water so as to cool the liquid metal and condense any vapors resulting from the boiling of the same. In other words, the liquid metal cooling of the aforementioned patents require rather complex and expensive cooling systems, since auxiliary water cooling and/or water cooled condensers are required in order to control the temperature of the liquid metal coolant.

Accordingly, the present invention has overcome the problems encountered with known systems of a mold cooling including air cooling, water cooling and liquid metal cooling, by providing a completely unique self-contained or enclosed water cooling system which facilitates nucleate boiling of the water coolant and thereby achieves a high rate of cooling through the utilization of the heat of evaporation, while simultaneously inhibiting deleterious film boiling by providing a thermal-siphon effect within the water cooled chamber.

SUMMARY OF THE INVENTION

Basically the present invention relates to the utilization of a closed self-contained liquid cooling system for cooling glass forming apparatus, as opposed to the enclosed continuously circulating liquid cooling systems of the prior art. The use of a liquid coolant, such as water, for removing heat from molds and the like relies upon the contact between the coolant and the back surface of the forming wall in contact with the molten glass. Since the temperature of the forming surface in contact with the molten glass is above the boiling temperature of the coolant, nucleate boiling will take place thus providing effective heat removal from the forming surface by utilizing the large latent heat of evaporation of the liquid coolant, such as water. However, in order to prevent film boiling and the resultant vapor layer from forming between the mold and the coolant, which acts as an insulating layer and thus prevents further effective heat transfer, a deflector or shroud is inserted within the coolant reservoir, which surrounds the forming surface, between the forming surface which may be a mold insert and the remainder of the mold casing. The shroud creates a thermal-siphon effect, allowing vapor adjacent the back surface of the forming wall to escape to a common reservoir. Although the cooling system is self-contained and completely enclosed, means are provided for regulating the maximum pressure buildup within the reservoir system, and for occasionally or periodically adding additional coolant to the system as may be desired, but as separate, individual, discrete batch-like additions as opposed to the continuous flow of the prior art.

It thus has been an object of the present invention to provide a novel and relatively easily manufacturable self-contained and enclosed liquid cooling system for effectively cooling glass forming apparatus through nucleate boiling while simultaneously inhibiting the detrimental effects of film boiling.

BRIEF DESCRIPTION OF THE DRAWINGS

The FIGURE is a somewhat schematic side elevational view in section of glass forming apparatus including a mold incorporating the cooling system of the present invention.

DESCRIPTION OF THE PREFERRED EMBODIMENTS

Referring now to the drawing, glass forming apparatus for pressing glass articles is shown including a mold assembly 10, a plunger 12, and a mold ring 14. A glass article G, such as a vessel, is shown being press formed in the cavity between the mold 10 and plunger 12. The plunger 12 which may be formed of any suitable material such as stainless steel and high nickel alloys and which may be suitably cooled as known in the prior art, and the mold ring 14 which may be made of suitable materials such as stainless steel, cast iron or ductile iron as desired, may both be of conventional construction, and as such do not form a part of the present invention.

The mold assembly 10 is shown including a mold insert 16, which comprises the glass-contacting forming wall portions of the mold assembly, and includes a forming surface 18 in contact with the molten glass forming article G, and a back surface 20 in contact with a cooling fluid F. The mold insert 16 providing the glass-contacting portion of the mold, is formed of a suitable material which is compatible with the glass composition being formed and which has relatively high heat conductivity so as to readily convey heat away from the forming surface 18 to the cooled back surface 20. Materials such as 420 stainless steel, inconel, cast iron and bronze may be utilized as a mold insert depending upon the glass composition being formed.

The insert 16 is retained within a housing or mold carrier 22 which forms a cavity 23 therebetween provided with a reservoir 24 of cooling fluid F. A chamber 26 within cavity 23 and above the level of the fluid F in reservoir 24, is provided for accommodating vapor V which is produced upon the nucleate boiling of the fluid F. A preset or adjustable pressure release valve 28 is shown communicating with chamber 26, and may be used to regulate the pressure within the reservoir 24 and chamber 26 so that the temperature at which the boiling of cooling fluid F occurs may also be regulated.

A deflector or shroud 30 is positioned within the reservoir portion of the cavity 23 between the mold insert 16 and the housing 22, so as to surround and be spaced-apart from the back surface 20 of the insert 16. A plurality of openings or holes 32 are formed through the bottom wall 34 of the deflector 30. As shown, a plurality of bubbles B are formed adjacent the back surface 20 of mold insert 16 upon the nucleate boiling of the cooling fluid F. The bubbles B travel upwardly within the reservoir 24 between sidewalls 36 of the deflector 30 and the back surface 20 of the mold insert 16, and are collected as a vapor V in chamber 26. As the hotter vaporized fluid flows upwardly between the shroud walls 36 and the mold insert 16, the cooler fluid in the reservoir 24 flows downwardly between the housing 22 and the sidewalls 36 of the deflector 30 toward the bottom of cavity 23 and then upwardly through the openings 32 in the bottom wall 34, where such fluid becomes heated by the insert 16 and provides a scrubbing or cleansing effect to avoid the formation of film boiling adjacent surface 20. That is, the shroud 30 creates a thermal-siphon effect within reservoir 24 and circulates the fluid F in a manner which allows the bubbles B to escape to the vapor chamber 26 while providing an ingress of cooler fluid through openings 32 in the bottom wall 34 to purge the back surface 20, and prevent the buildup of a deleterious vapor layer adjacent that surface 20 which would otherwise result from film boiling.

The pressure release valve 28, communicating with vapor chamber 26, prevents any excessive pressure from building up within the reservoir 24 and chamber 26, and further provides a means for regulating the pressure level within the cavity 23, which thus dictates the temperature at which the cooling fluid will boil, thereby controlling the heat removal from the mold. By providing increased heat removal rates, higher production speeds may be accomplished while still maintaining the mold parts within acceptable temperature levels.

Should it be necessary to replenish the supply of cooling fluid within the chamber 24, a quick connect fitting 38 projects from a bottom portion of the housing 22 and communicates with the reservoir 24 through a check valve 40. The check valve 40 seals the cavity 23 and reservoir 24 from the exterior as a self-contained cooling system. Thus, although the mold assembly 10 includes a self-contained or enclosed water cooling system, additional cooling fluid may be periodically added to the system as may be required to replenish any of the supply which may be expelled through the relief valve 28. The housing or mold carrier 22, which houses the cooling system in a self-contained manner, may be formed of any suitable materials such as cast iron or cast steel.

It is of course apparent, that liquid coolants other than water may be utilized if desired, and means such as strategically located grooves may be formed in the back surface 20 of the mold insert 16 to facilitate removal of the vapors formed upon nucleate boiling of the cooling fluid. In addition, a condenser or heat exchanger may be provided within the vapor chamber 26 if desired to recycle the cooling fluid F. Further, although the cooling system has been disclosed with respect to the mold assembly, it is understood that such arrangement could also be adapted for the plunger. Also, additional or separate reservoirs could be provided so that different regions of the mold insert could be cooled at different rates and independently of each other.

Although we have set forth the now preferred embodiments of the invention, it will become apparent to those skilled in the art that various changes and modifications may be made thereto without departing from the spirit and scope thereof as defined in the appended claims.

We claim:

1. Apparatus for forming glass articles from molten glass which comprises, a forming assembly, said assembly including a housing having an enclosed cavity formed therein, said housing including a glass-contacting portion forming wall portions of said cavity, a reservoir of cooling fluid enclosed within said cavity, means communicating with said reservoir for collecting vapor generated by the nucleate boiling of said cooling fluid within said reservoir adjacent wall portions of said glass-contacting portion, pressure regulating means for regulating the pressure within said cavity and accordingly the boiling temperature of said cooling fluid, and thermalsiphoning means having openings therein for passage of cooling fluid positioned within said cavity for circulating said enclosed cooling fluid within the confines of said reservoir and through said circulation of said fluid inhibiting the formation of a vapor barrier within said reservoir adjacent said glass-contacting portion.

2. Apparatus for forming glass articles from molten glass as defined in claim 1 including means for sealing said cooling fluid within said cavity to provide a self-contained and enclosed fluid cooling system.

3. Apparatus for forming glass articles from molten glass as defined in claim 1 which includes quick connect means for periodically adding additional cooling fluid to said reservoir.

4. Apparatus for forming glass articles from molten glass as defined in claim 1 wherein said reservoir is filled with water and said means for collecting vapor comprises a vapor chamber above said reservoir which communicates with said means for regulating the pressure within said cavity.

5. Apparatus for forming glass articles from molten glass as defined in claim 1 wherein said means for regulating the pressure within said cavity comprises a pressure release valve which prevents excessive pressure buildup in said cavity and regulates the temperature at which said cooling fluid will boil.

6. Apparatus for forming glass articles from molten glass as defined in claim 1 wherein said thermalsiphoning means includes a shroud positioned within said cavity in spaced apart relationship about said glass-contacting portion, and said shroud including a bottom wall with a plurality of openings extending therethrough for the passage of cooling fluid and an upwardly extending sidewall for guiding vapor from said nucleate boiling toward said means for collecting said vapor.

7. Apparatus for forming glass articles from molten glass as defined in claim 1 wherein said forming assembly is a mold assembly and said glass-contacting portion is a mold insert forming the glass-contacting portion of said housing, and said thermal siphoning means comprises a shroud having holes in a bottom wall thereof and positioned within said cavity between said mold insert and said housing for circulating said cooling fluid and purging the buildup of vapor within said reservoir adjacent said mold insert.

* * * * *